(12) United States Patent
Murai et al.

(10) Patent No.: US 6,767,134 B2
(45) Date of Patent: Jul. 27, 2004

(54) ROLLER BEARING

(75) Inventors: Takashi Murai, Kanagawa (JP); Shinichi Tsunashima, Kanagawa (JP); Osamu Fujii, Kanagawa (JP)

(73) Assignee: NSK Ltd., Tokyo (JP)

( * ) Notice: Subject to any disclaimer, the term of this patent is extended or adjusted under 35 U.S.C. 154(b) by 70 days.

(21) Appl. No.: 10/188,037

(22) Filed: Jul. 3, 2002

(65) Prior Publication Data

US 2003/0012477 A1 Jan. 16, 2003

(30) Foreign Application Priority Data

Jul. 5, 2001 (JP) ..................................... P. 2001-205301

(51) Int. Cl.[7] ............................................. F16C 33/36
(52) U.S. Cl. ..................................... 384/568; 384/565
(58) Field of Search ................................ 384/564, 565, 384/568, 571

(56) References Cited

U.S. PATENT DOCUMENTS

| | | |
|---|---|---|
| 3,740,108 A | 6/1973 | Fernlund |
| 4,318,574 A | 3/1982 | Nakamura |
| 5,890,815 A | 4/1999 | Ijuin et al. |
| 6,086,262 A | 7/2000 | Matsumoto |

FOREIGN PATENT DOCUMENTS

| | | |
|---|---|---|
| DE | 195 31 965 A1 | 3/1996 |
| DE | 100 42 901 A1 | 6/2001 |
| JP | 51-156346 | 12/1976 |
| JP | 56-17415 | 2/1981 |
| JP | 4-331813 A | 11/1992 |
| JP | 6-241235 | 8/1994 |
| JP | 07-012133 | 1/1995 |
| JP | 7-42746 | 2/1995 |
| JP | 9-236131 | 9/1997 |
| JP | 10-196660 | 7/1998 |

*Primary Examiner*—Thomas R. Hannon
(74) *Attorney, Agent, or Firm*—Sughrue Mion, PLLC

(57) ABSTRACT

The contact portion of the end face of a conical roller, which is a portion to be slidingly contacted with a collar portion, is ground such that the outer contour line of the section thereof has a continuously curved line which passes through at least not only the first point but also between the third position and fourth position.

5 Claims, 9 Drawing Sheets

FIG. 10(a)

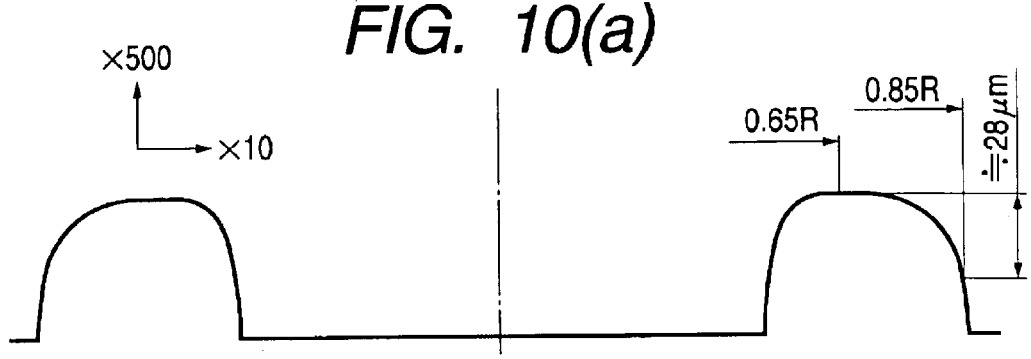

SHAPE OF A CYLINDRICAL ROLLER HAVING A ROLLER END FACE DROP QUANTITY OF ABOUT 30μm ACCORDING TO THE EMBODIMENT 2 OF THE INVENTION

FIG. 10(b)

(COMPARATIVE EXAMPLE)

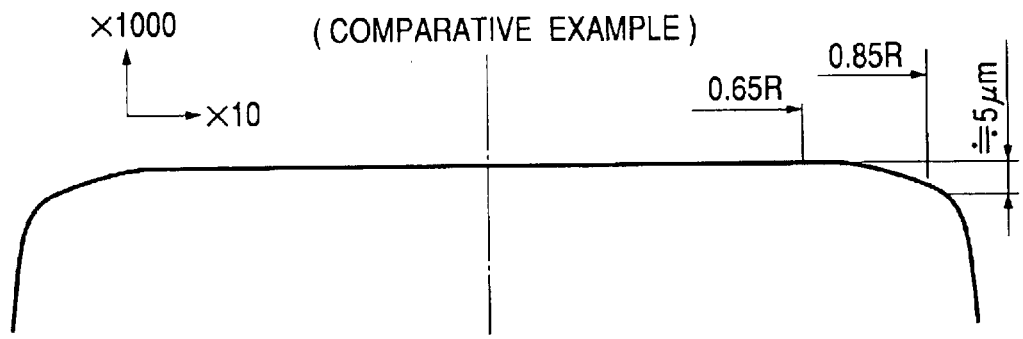

SHAPE OF A CYLINDRICAL ROLLER HAVING A ROLLER END FACE DROP QUANTITY OF ABOUT 5μm ACCORDING TO THE EMBODIMENT 1 OF THE INVENTION

FIG. 10(c)

(PRACTICAL EXAMPLE)

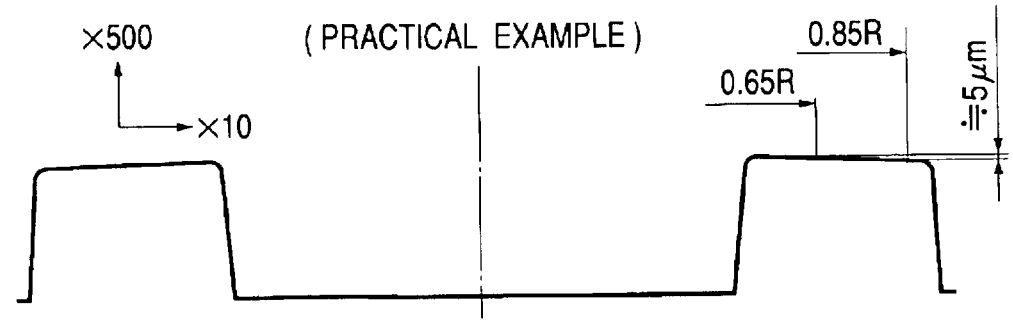

FLAT SHAPE OF THE END FACE OF A CYLINDRICAL ROLLER OF A COMPARATIVE EXAMPLE

SHAPE OF A CYLINDRICAL ROLLER HAVING A ROLLER END FACE DROP QUANTITY OF ABOUT 10μm ACCORDING TO THE EMBODIMENT OF THE INVENTION

FLAT SHAPE OF THE END FACE OF A CYLINDRICAL ROLLER OF A COMPARATIVE EXAMPLE

ROLLER BEARING

The present invention relates to a roller bearing such as a conical roller bearing and a cylindrical roller bearing and, in particular, to a roller bearing in which a collar portion for guiding a plurality of rollers in the circumferential direction of a ring is formed in the end portion of the ring.

Generally, in most of roller bearings such as a conical roller bearing and a cylindrical roller bearing, a collar portion for guiding a plurality of rollers in the circumferential direction of a ring is formed in the end portion of the ring, and the end face of the roller is slidingly contacted with the collar portion. In the roller bearing of this type, in case where the ring is rotated at a high speed, there is generated frictional heat between the collar portion and roller, thereby raising a possibility that seizure can occur in the collar portion and roller. Thus, it is necessary to reduce the frictional heat that is generated between the collar portion and roller. In view of this, conventionally, for example, there are known a roller bearing structured such that there are formed a smooth portion and a valley portion in the end face of the roller and part of lubricating oil can be stored in the valley portion (JP-A-7-42746), and a roller bearing in which a plurality of fine recessed portions are formed in the roller guide surface of a collar portion to be slidingly contacted with the roller (JP-A-6-241235).

However, in both of the above-mentioned conventional roller bearings, the end face of the roller and the roller guide surface of the collar portion must be worked specially, which results in an increase in the manufacturing costs of the roller bearings. By the way, as a measure to reduce the frictional heat without enforcing special working on the end face of the roller as well as on the roller guide surface of the collar portion, there is known one which is disclosed in JP-A-9-236131. In this case, however, the portion of the roller to be contacted with the collar portion varies greatly in shape, which also causes an increase in the manufacturing cost of the roller bearing.

SUMMARY OF THE INVENTION

The present invention aims at eliminating the drawbacks found in the above-mentioned conventional roller bearings. Accordingly, it is an object of the present invention to provide a roller bearing which can reduce the frictional heat occurring between the roller and collar portion without enforcing special working on the end face of the roller or on the roller guide surface of the collar portion as well as without changing the shape of the roller greatly.

In attaining the above object, according to a first aspect of the present invention, there is provided a roller bearing including a collar portion formed in the end portion of a ring for guiding a plurality of cylindrical rollers in the circumferential direction of the ring, wherein a diameter of each of the cylindrical roller is expressed as $2R$, a position in which an end face of the cylindrical roller intersect with a center axial line of the cylindrical roller is expressed as an original point, a position distant from the original point by $0.65R$ in an outside diameter direction of the cylindrical roller is expressed as a first point, a position distant from the first point by $0.20R$ in the outside diameter direction of the cylindrical roller is expressed as a second point, a position distant from the second point by $0.0005R$ in the axial direction of the cylindrical roller is expressed as a third position, a position distant from the second point by $0.003R$ in the axial direction of the cylindrical roller is expressed as a fourth position, and the contact portion of the end face of the cylindrical roller to be slidingly contacted with the collar portion is ground so as to have a continuously curved shape in which the outer contour line of the section of the end face of the cylindrical roller passes through the first point and passes between the third and fourth positions.

Also, according to a second aspect of the present invention, there is provided a roller bearing including a collar portion formed in the end portion of a ring for guiding a plurality of conical rollers in the circumferential direction of the ring, wherein a diameter of the conical roller is expressed as $2R$, a position in which an end face of each of the conical rollers intersects with the center axial line of the conical roller is expressed as an original point, a position distant from the original point by $0.65R$ in an outside diameter direction of the conical roller is expressed as a first point, a position distant from the first point by $0.20R$ in the outside diameter direction of the conical roller is expressed as a second point, a position distant from the second point by $0.0065R$ in the axial direction of the conical roller is expressed as a third position, a position distant from the second point by $0.01R$ in the axial direction of the conical roller is expressed as a fourth position, and the contact portion of the end face of the conical roller to be slidingly contacted with the collar portion is ground so as to have a continuously curved shape in which the outer contour line of the section of the end face of the conical roller passes through the first point and passes between the third and fourth positions.

Further, according to a third aspect of the present invention, in a roller bearing as set forth in the first or second aspect of the present invention, the longitudinal elastic coefficient of an elastic grindstone for finishing the end face of the roller is set in the range of 10 MPa to 500 MPa.

Still further, according to a fourth aspect of the present invention, there is provided a roller bearing including in an end portion of a ring a collar portion for guiding a plurality of cylindrical rollers in the circumferential direction of the ring, wherein a contact portion of an end face of the cylindrical roller to be slidingly contacted with the collar portion is ground so as to have a continuously curved shape in which the outer contour line of the end face contact portion at a section decreases as the outer contour line goes outwardly in the radius direction of the roller.

According to the above aspects of the present invention, the end face (roller guide surface) of the collar portion on its sliding contact side with the roller is generally formed open at a certain angle with respect to a surface perpendicular to the raceway surface of the ring in order to facilitate the introduction of lubricating oil into between the roller and the roller guide surface of the collar portion. Therefore, a point of intersection with a grinding relief portion formed in the roller guide surface of the collar portion is geometrically easiest to touch the end face of the roller. On the other hand, since the contact side of the roller end face to be slidingly contacted with the collar portion is formed at right angles to the outside diameter surface of the roller, a point of intersection between a connecting portion (chamfer portion), which connects the outside diameter surface of the roller with the end face of the roller, and the end face of the roller is geometrically easiest to touch the collar portion.

Also, since lubricating oil existing in a portion, where the end face of the roller and collar portion is contacted with each other, is pulled into a small clearance between them due to the viscosity thereof, the shape of the mutual contact portion between the roller end face and collar portion may preferably be formed to have a clearance before and behind the mutual contact portion. Especially, because the shape of the end face of the roller is formed as a continuously curved shape, there is eliminated the possibility that an oil film can be cut due to high surface pressure occurring locally in the mutual contact portion, thereby being able to produce the oil film positively. Thanks to this, the seizure resisting property of the roller bearing can be enhanced.

On the other hand, since the Young's modulus (longitudinal elastic coefficient) of a grindstone used to grind the end face of the roller is set in the range of 10 MPa to 500 MPa, the contact portion of the roller end face to be slidingly contacted with the collar portion can be formed as a continuously smooth arc surface not as a flat surface. In this case, for example, when grinding the end face of the roller on a horizontal or vertical duplex head grinder, the arc-surface roller end face contact portion is held by and between two grindstones and also the support rigidity of grains forming the grindstones is small; and, therefore, in case where the quantity of interference between the roller end face and grindstone does not increase, the end face portion cannot be ground and thus it cannot be removed by grinding. Accordingly, while the grindstone is interfering with the roller end face, the interference area of the grindstone naturally spreads up to the roller chamfer portion. And, under such interference condition between the grindstone and roller end face, grinding starts in the connecting portion between the roller end face and chamfer portion in which the pressure becomes highest, and the grinding widens to the chamber portion and plane portion of the roller end face gradually and continuously, with the result that the shape of the roller end face finally obtained becomes a continuously curved shape. Thanks to this, in the sliding contact portion between the roller and collar portion, an oil film can be formed smoothly and positively, which makes it possible to enhance the seizure resisting property of the roller bearing.

BRIEF DESCRIPTION OF THE DRAWINGS

FIG. 10 is a schematic view of the shape of the end face of a cylindrical roller to be incorporated into a cylindrical roller bearing; and, FIG. 11 is a schematic view of the shape of the end face of a cylindrical roller to be incorporated into a cylindrical roller bearing.

DESCRIPTION OF THE PREFERRED EMBODIMENTS

Now, description will be given below of the preferred embodiments of a roller bearing according to the present invention with reference to the accompanying drawings.

Figure 1:
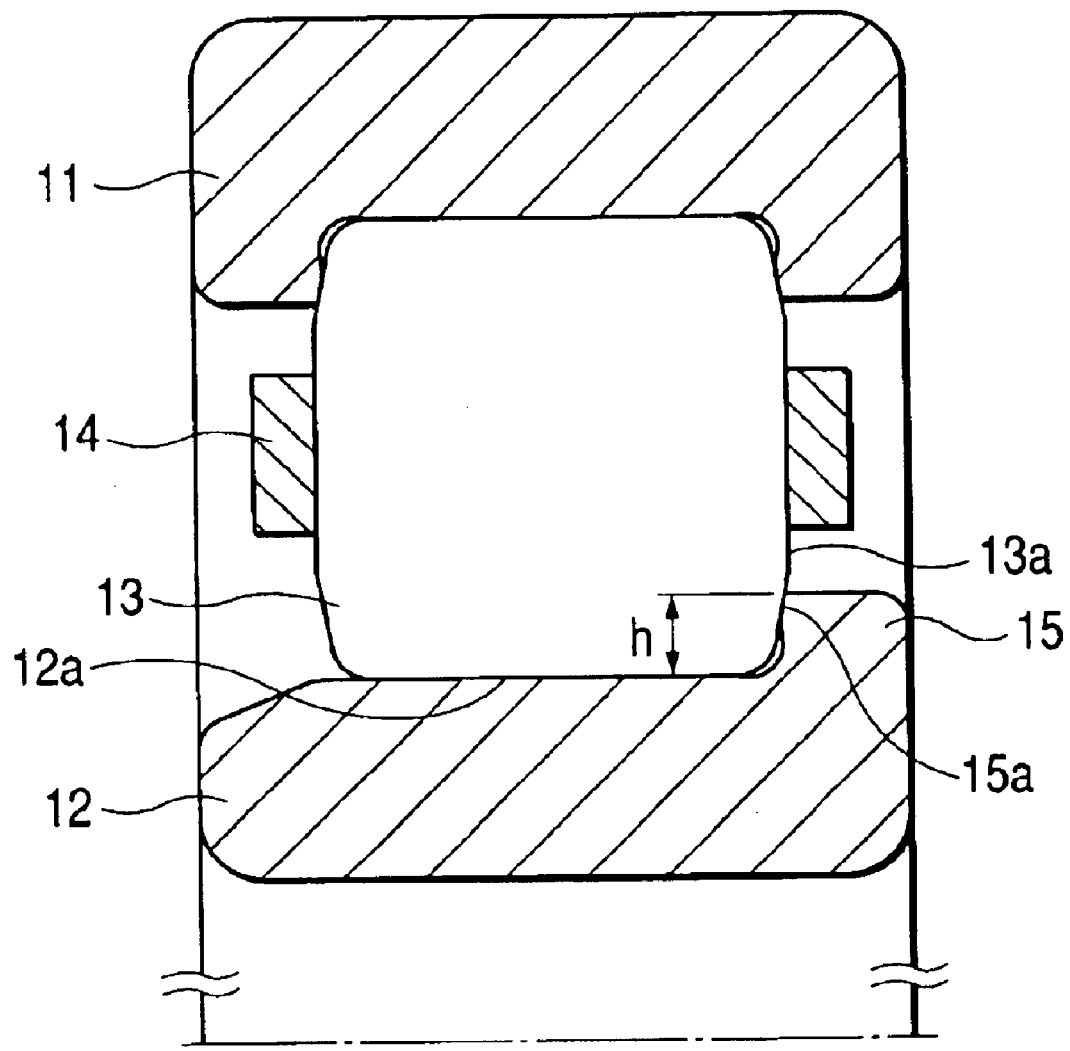
FIG. 1 is a partial section view of a first embodiment of a roller bearing according to the present invention.

FIG. 1 shows a partial section view of a first embodiment of a roller bearing according to the present invention. As shown in FIG. 1, a roller bearing according to the present embodiment comprises an outer ring 11, an inner ring 12, a cylindrical roller 13 and a retainer 14; and, in the right (in FIG. 1) end portion of the inner ring 12, there is formed a collar portion 15. The collar portion 15 is used to guide the cylindrical roller 13 in the circumferential direction of the outer ring 11 and inner ring 12. In case where the diameter of the cylindrical roller 13 is 2R (=19 mm), the height h from the raceway surface 12a of the inner ring 12 to the leading end of the collar portion 15 is set such that h=approx. 0.38R (3.65 mm). Also, the collar portion 15 has a roller guide surface 15a extending almost at right angles to the raceway surface 12a of the inner ring 12. The cylindrical roller 13 is structured such that, while its end face 13a is slidingly contacted with the roller guide surface 15a of the collar portion 15, it rolls on the raceway surface 12a of the inner ring 12.

Figure 2:
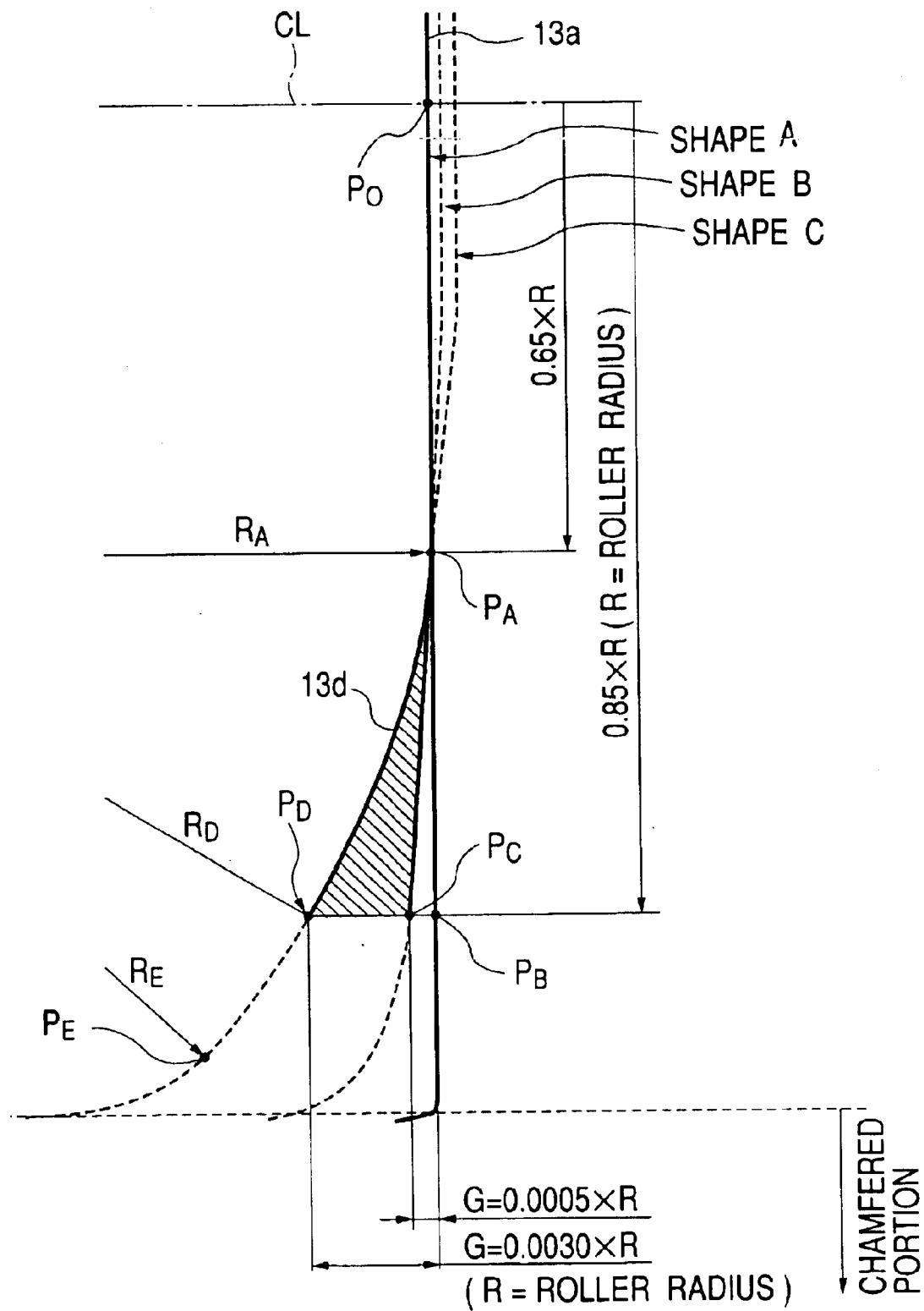
FIG. 2 is a section view of the contact portion of the end face of a cylindrical roller to be slidingly contacted with a collar portion shown in FIG. 1.

Now, FIG. 2 shows the contact portion of the end face of the cylindrical roller 13 to be slidingly contacted with the collar portion 15. As shown in FIG. 2, the contact portion of the end face of the cylindrical roller 13, which can be slidingly contacted with the collar portion 15, is ground into a convexly spherical shape by an elastic grindstone (not shown). Also, in case where the diameter of the cylindrical roller 13 is expressed as 2R, a position in which the end face 13a of the cylindrical roller 13 intersects with the center axial line CL of the cylindrical roller 13 is expressed as an original point Po, a position distant from the original point Po by 0.65R in the outside diameter direction of the cylindrical roller 13 is expressed as a first point $P_A$, a position distant from the first point $P_A$ by 0.20R in the outside diameter direction of the cylindrical roller 13 is expressed as a second point $P_B$, a position distant from the second point $P_B$ by 0.0005R in the axial direction of the cylindrical roller 13 is expressed as a third position $P_C$, a position distant from the second point $P_B$ by 0.003R in the axial direction of the cylindrical roller 13 is expressed as a fourth position $P_D$, the contact portion of the end face of the cylindrical roller 13 to be slidingly contacted with the collar portion is ground by an elastic grindstone so as to have a continuously curved shape in which the outer contour line 13b of the section of the end face of the cylindrical roller 13 passes through the first point $P_A$ as well as passes between third position $P_C$ and fourth position $P_D$. Also, the present end face is ground so as to have a continuously curved shape which decreases in the radius of curvature as it goes outwardly in the radial direction thereof (for example, in case where the radii of the points $P_A$, $P_D$ and $P_B$ are expressed as $R_A$, $R_D$ and $R_E$ respectively, $R_A > R_D > R_E$). By the way, the end face 13a of the cylindrical roller 13 is ground on a horizontal or vertical duplex head grinder using an elastic grindstone having a Young's modulus set in the range of 10 MPa to 500 MPa.

Figure 3:
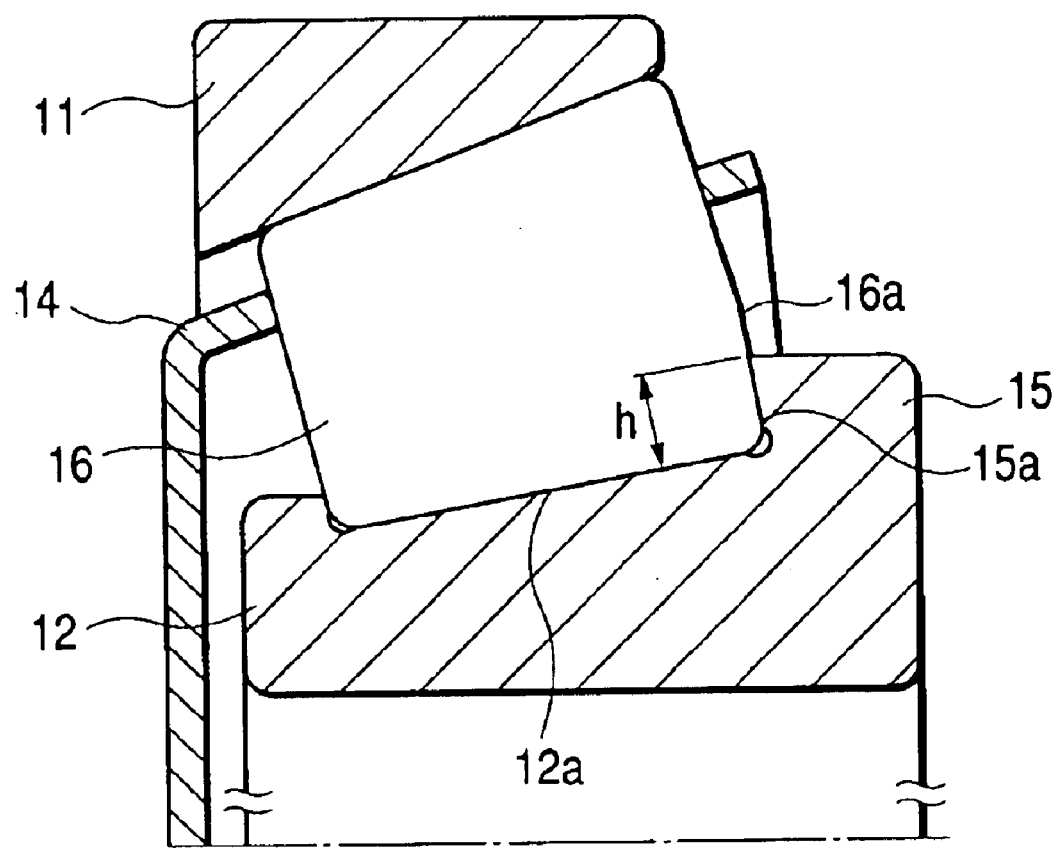
FIG. 3 is a partial section view of a second embodiment of a roller bearing according to the present invention.

Next, FIG. 3 shows a partial section view of a second embodiment of a roller bearing according to the present invention. As shown in FIG. 3, a roller bearing according to the present embodiment comprises an outer ring 11, an inner ring 12, a conical roller 16 and a retainer 14; and, in the right (in FIG. 3) end portion of the inner ring 12, there is formed a collar portion 15. The collar portion 15 is used to guide the cylindrical roller 13 in the circumferential direction of the outer ring 11 and inner ring 12. In case where the maximum diameter of the conical roller 16 is 2R, the height h from the raceway surface 12a of the inner ring 12 to the leading end of the collar portion 15 is set such that h=approx. 0.6R. Also, the collar portion 15 has a roller guide surface 15a extending almost at right angles to the raceway surface 12a of the inner ring 12. The conical roller 16 is structured such that, while its end face 16a is slidingly contacted with the roller guide surface 15a of the collar portion 15, it rolls on the raceway surface 12a of the inner ring 12.

Figure 4:
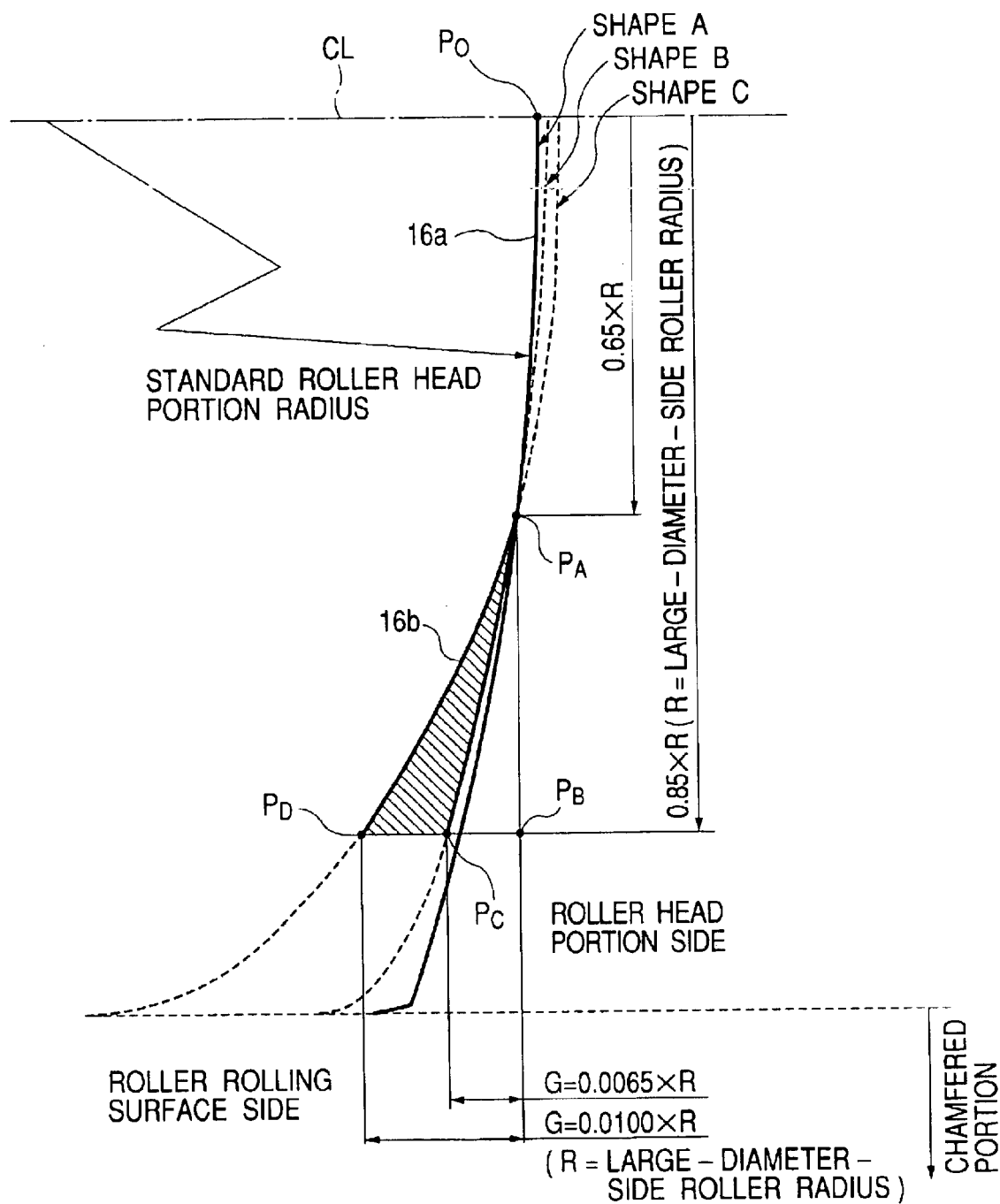
FIG. 4 is a section view of the contact portion of the end face of a conical roller to be slidingly contacted with a collar portion shown in FIG. 3.

Now, FIG. 4 shows the contact portion of the end face of the conical roller 16, which is a portion to be slidingly contacted with the collar portion 15. As shown in FIG. 4, the contact portion of the end face of the conical roller 16 to be slidingly contacted with the collar portion 15 is ground into a convexly spherical shape by an elastic grindstone (not shown). Also, in case where the diameter of the conical roller 16 is expressed as 2R, a position in which the end face 16a of the conical roller 16 intersects with the center axial line CL of the conical roller 16 is expressed as an original point $P_o$, a position distant from the original point $P_o$ by 0.65R in the outside diameter direction of the conical roller 16 is expressed as a first point $P_A$, a position distant from the first point $P_o$ by 0.85R in the outside diameter direction of the conical roller 16 is expressed as a second point $P_B$, a position distant from the second point $P_B$ by 0.0065R in the axial direction of the conical roller 16 is expressed as a third position $P_C$, a position distant from the second point $P_B$ by 0.01R in the axial direction of the conical roller 16 is expressed as a fourth position $P_D$, the contact portion of the end face of the conical roller 16 to be slidingly contacted with the collar portion 15 is ground by an elastic grindstone so as to have a continuously curved shape in which the outer contour line 16b of the section of the end face of the conical roller 16 passes through the first point $P_A$ as well as passes between third position $P_C$ and fourth position $P_D$. By the way, the end face 16a of the conical roller 16 is ground on a horizontal or vertical duplex head grinder using an elastic grindstone having a Young's modulus set in the range of 10 MPa to 500 MPa.

Rotation Evaluation Test 1

Figure 5:
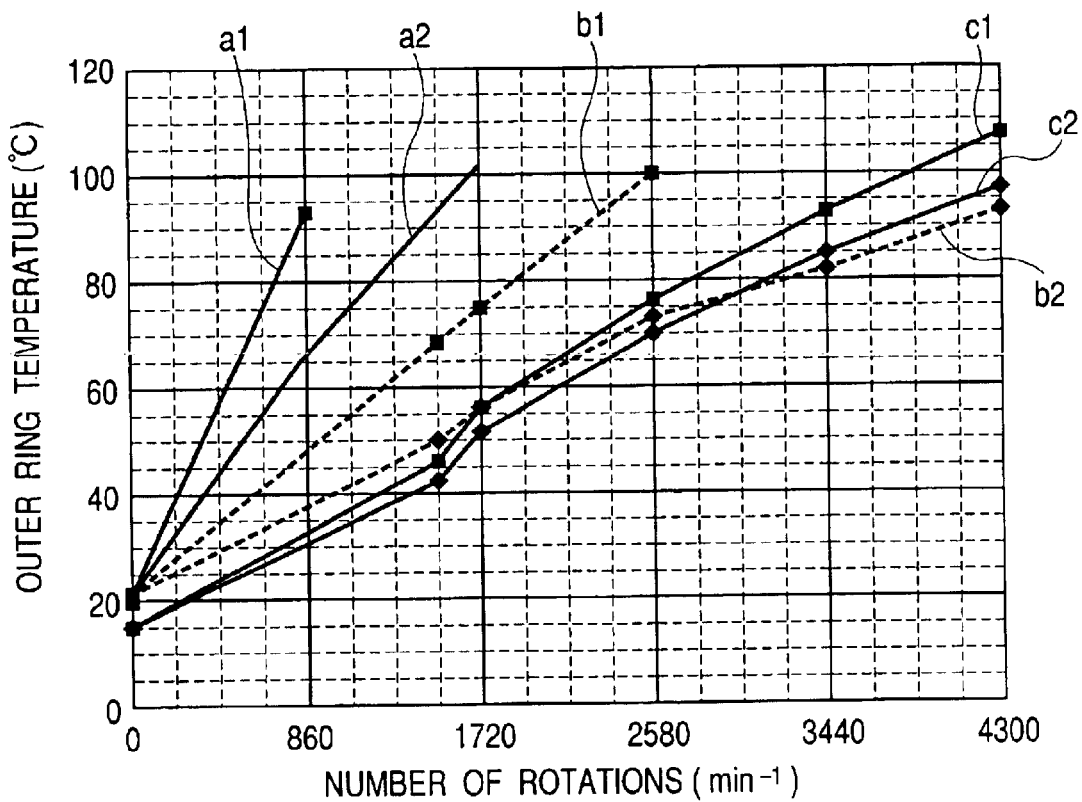
FIG. 5 is a graphical representation of variations in the temperature of an outer ring when the cylindrical roller bearing shown in FIG. 1 is rotated.

A rotation evaluation test was conducted on the cylindrical bearing (roller diameter: 19 mm, collar portion height h: 3.65 mm) shown in FIG. 1 under the following conditions, while the temperatures of the outer ring in the test were measured. FIG. 5 shows the results of the outer ring temperatures measured. Here, FIGS. 10(a) to 10(c)) respectively show the shapes of the end faces of rollers used in the present rotation evaluation test.

| TEST CONDITIONS | |
|---|---|
| Test bearing: | NJ218E |
| Maximum number of rotations: | 4300 min$^{-1}$ |
| Axial load: | 5880N |
| Radial load: | 9800N |
| Oil bath lubrication: | VG68 |

In FIG. 5, solid lines a1 and a2 respectively show the outer ring temperatures of a cylindrical roller bearing (which is hereinafter referred to as a comparison example) in case where a drop quantity G (see FIG. 2) at a position distant by 0.85R from the point Po in the outside diameter direction of the bearing is set such that G=0.00011R (roller diameter: 19 mm, 9.5×0.00011=approx. 1 μm) which exists between the two points $P_B$ and $P_C$ in FIG. 2. Also, dotted lines b1 and b2 respectively show the outer ring temperatures of a cylindrical roller bearing (which is hereinafter referred to as an embodiment 1) in case where a drop quantity G at a position distant by 0.85R from the point $P_o$ in the outside diameter direction of the bearing is set such that G=0.0005R (roller diameter: 19 mm, 9.5×0.0005=approx. 5 μm) which exists at the $P_C$ in FIG. 2. Further, solid lines c1 and c2 respectively show the outer ring temperatures of a cylindrical roller bearing (which is hereinafter referred to as an embodiment 2) in case where a drop quantity G at a position $P_D$ distant by 0.85R from the point $P_o$ in the outside diameter direction of the bearing is set such that G=0.003R (roller diameter: 19 mm, 9.5×0.003=approx. 24 μm) which exists at the $P_B$ in FIG. 2.

By the way, in grinding the roller end faces, similarly to the related art, there was used a horizontal duplex head grinder; and, in the embodiments 1 and 2, as a grindstone for grinding the end faces of the cylindrical rollers, there was used an elastic grindstone having a Young's modulus of 16 MPa (normally, a grindstone including a virtified bond has a Young's modulus of about 50000 to 100000 MPa, and a grindstone including a resinoid bond has a Young's modulus of about 5000–20000 MPa). Also, referring to the section shapes of the end faces of the rollers shown in FIG. 10, they may satisfy the condition that, for example, when they are drawn by a horizontal linear-type shaping machine with a vertical magnification of about 500 to 2000 (a horizontal magnification of about 5 to 20), the continuity and drop quantities thereof can be confirmed at the respective points.

As shown in FIG. 5, in the comparison example, in case where the rotation speed of the bearing reaches 1720 min$^{-1}$, the outer ring temperature exceeds 100° C. and, on the other hand, in the embodiments 1 and 2 of the present invention, even in case where the rotation speed of the bearing reaches 1720 min$^{-1}$, the outer ring temperature does not exceed 80° C. The reason for this is as follows: that is, in the comparison example, the surface pressure of the collar portion end face to be slidingly contacted with an intersecting point portion between the end face of the cylindrical roller and the chamfer portion of the cylindrical roller increases to a very great extent to thereby cause the outer ring temperature to rise (both of the solid lines a1 and a2 show that the outer ring temperature rises up to about 100° C. before the rotation speed reaches 1720 min$^{-1}$; and, on the other hand, in the embodiments 1 and 2, since there does exist such an edge portion as in the comparison example, the surface pressure does not rise so high when compared with the comparison example.

Also, when the embodiments 1 and 2 are compared with each other, the embodiment 2 is lower in an increase in the outer ring temperature than the embodiment 1. This may be because the quantity of lubricating oil to be introduced into between the end face of the cylindrical roller and collar portion varies according to the drop quantities.

By the way, although not shown, in the case of a roller bearing the drop quantity of which at a position distant by 0.85R from the point $P_o$ is larger than the point $P_D$ in FIG. 2 (about 40 to 50 μm), there were obtained test results which are almost similar to the embodiment 2. However, in this case, the grinding time using an elastic grindstone increases over the embodiment 2.

Rotation Evaluation Test 2

Figure 6:
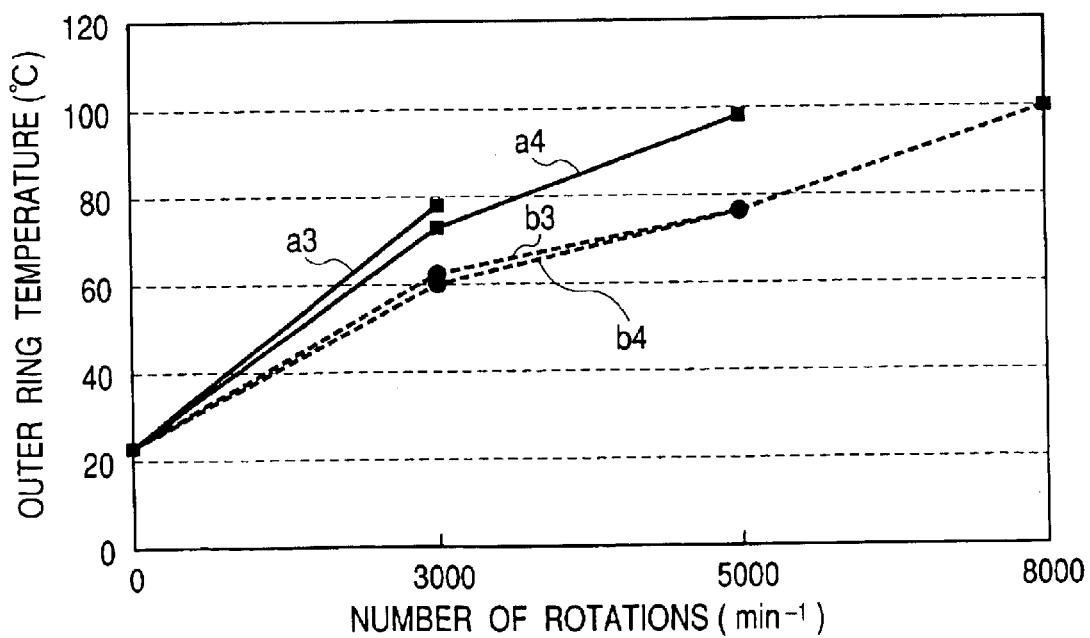
FIG. 6 is a graphical representation of variations in the temperature of an outer ring when the cylindrical roller bearing shown in FIG. 1 is rotated.
Figure 11A:
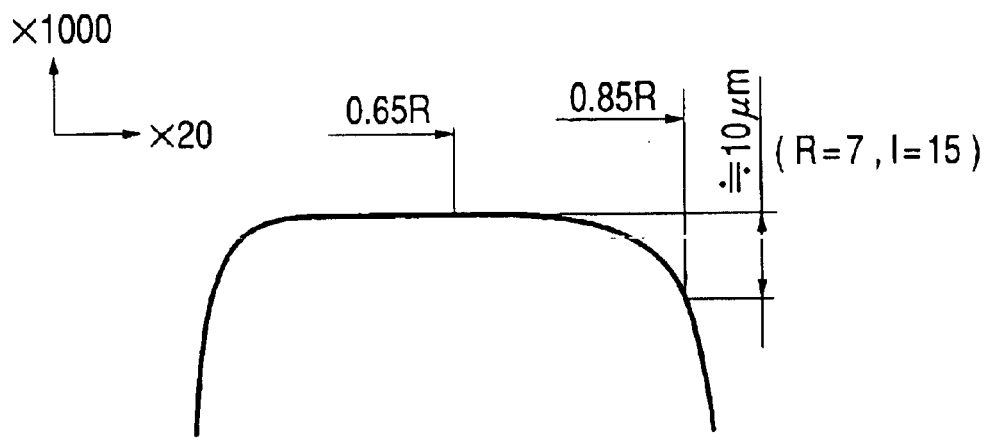
Figure 11B:
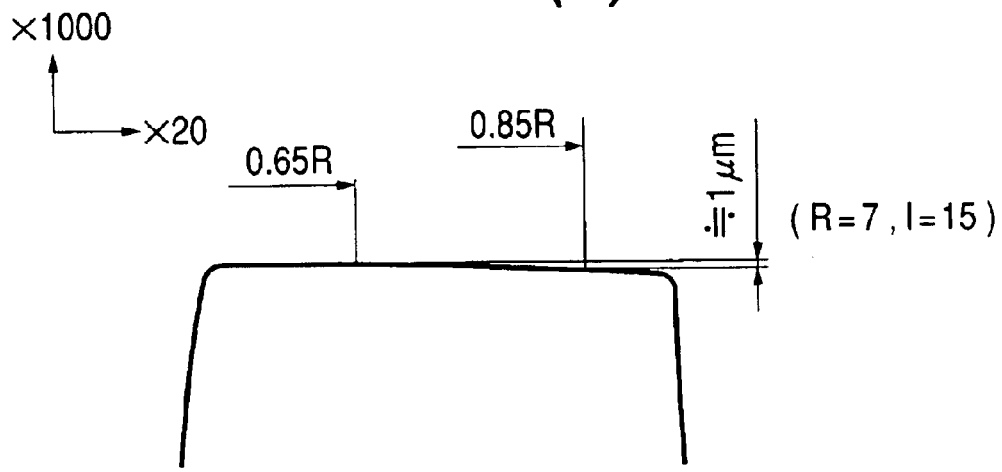

Another rotation evaluation test 2 was conducted on roller bearings each using a cylindrical roller having a diameter of 14 mm under the following conditions, and the outer ring temperatures were measured. FIG. 6 shows the results of the rotation evaluation test 2. Here, the shapes of the end faces of the rollers used in the test are as shown in FIGS. 11(a) and 11(b).

| TEST CONDITIONS | |
|---|---|
| Test bearing: | NJ308E (roller diameter: 14 mm, L = 15 mm, collar portion height h = 2.80 mm) |
| Maximum number of rotations: | 8000 min$^{-1}$ |
| Axial load: | 392N |
| Radial load: | 9800N |
| Oil bath lubrication: | VG68 |

In FIG. 6, solid lines a3 and a4 respectively show the outer ring temperatures of a cylindrical roller bearing (which is hereinafter referred to as a comparison example) in case where a drop quantity G (see FIG. 2) at a position distant by 0.85R from the point $P_o$ in the outside diameter direction of the bearing is set such that G=0.00014R (roller diameter: 14 mm, 7×0.00014=approx. 1 μm) which exists between the two points $P_B$ and $P_C$ in FIG. 2. Also, dotted lines b3 and b4 respectively show the outer ring temperatures of a cylindrical roller bearing (which is hereinafter referred to as an embodiment 3) in case where a drop quantity G at a position distant by 0.85R from the point $P_o$ in the outside diameter direction of the bearing is set such that G=0.0014R (roller diameter: 14 mm, 7×0.0014=approx. 10 μm) which exists between the $P_C$ and $P_D$ in FIG. 2.

As shown in FIG. 6, in the comparison example, in case where the number of rotations reaches 3000 min$^{-1}$, the outer ring temperature exceeds 70° and, in the embodiment 3, even in case where the number of rotations reaches 3000 min$^{-1}$, the outer ring temperature does not exceed 70°.

As can be seen clearly from the test results shown in FIGS. 5 and 6, since the contact portion of the end face of the cylindrical roller 13, which is a portion to be slidingly contacted with the collar portion 15, is ground such that the outer contour line of the section thereof has a continuously curved shape which passes through at least not only the first point $P_A$ but also between the third position $P_C$ and fourth position $P_D$, lubricating oil can be introduced easily into between the end face 13a of the cylindrical roller 13 and collar portion 15. Thanks to this, the frictional heat occurring between the cylindrical roller 13 and collar portion 15 can be reduced without enforcing special working on the end face 13a of the cylindrical roller 13 and the roller guide surface of the collar portion 15 or without changing the shape of the roller greatly.

Figure 7:
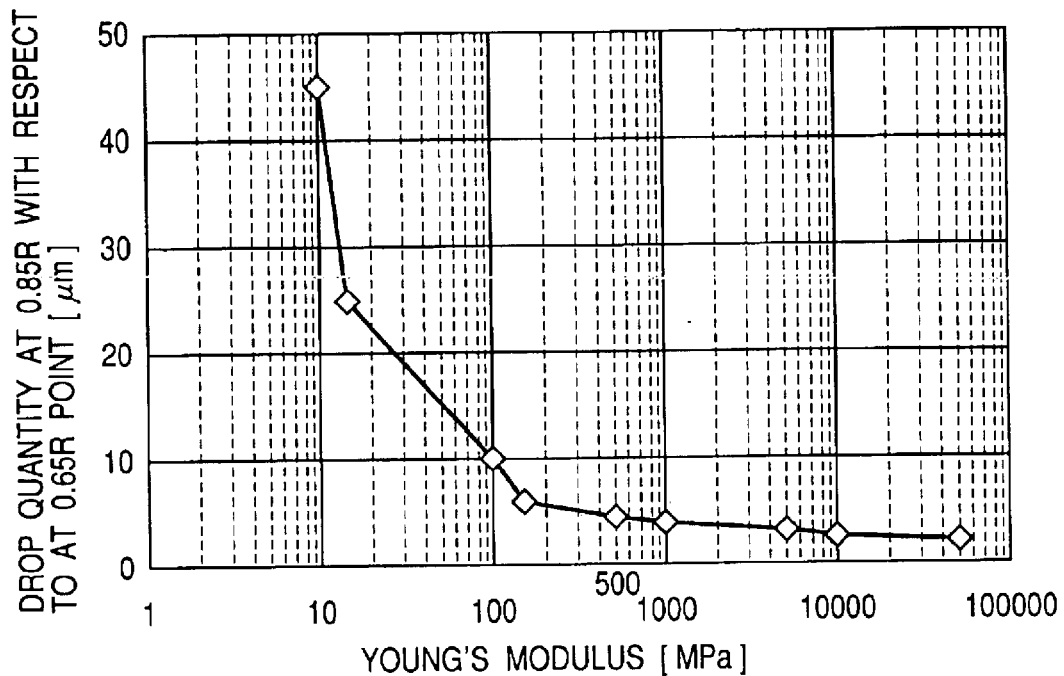
FIG. 7 is a graphical representation of the relationship between the Young's modulus of a grindstone and the drop quantity of the end face of a roller.
Figure 8:
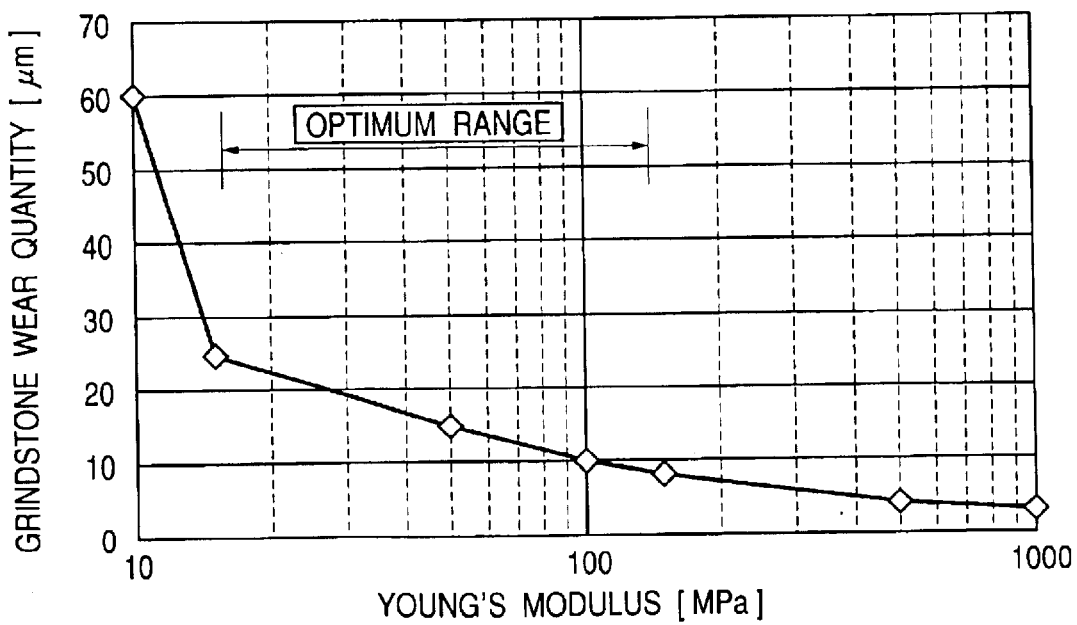
FIG. 8 is a graphical representation of the relationship between the Young's modulus of a grindstone and the wear quantity of the grindstone.

Next, the inventors checked the relationship between the Young's modulus of a grindstone and the drop quantity of the 0.85R point of the roller end face with respect the 0.65R point of the roller end face. FIG. 7 shows the results of this check. And, the inventors also checked the relationship between the Young's modulus of a grindstone used to grind the end face of a roller and the friction quantity of the grindstone. FIG. 8 shows the results of this check.

As shown in FIG. 7, in the case of a grindstone having a Young's modulus of 5000 MPa or more, since the support rigidity of an abrasive grain is high, in case where interference between the roller end face and grindstone exceeds a certain value, removal due to grinding is allowed to start. Thanks to this, interference up to the chamfer portion of the roller is not obtained but there is formed a flat end face, so that there can be obtained the stable length of the roller.

On the other hand, in the case of a grindstone having a Young's modulus of 500 MPa or less, the roller end face can be gradually ground into a continuously curved shape and, as shown in FIG. 7, the drop quantity of the roller end face increases. Further, in case where a grindstone having a small Young's modulus is used, the drop quantity increases. However, in the case of a grindstone having a Young's modulus of 10 MPa or lower, contrary to a grindstone having a high Young's modulus, the length dimension of the roller becomes unstable and the grinding time also increases. As shown in FIG. 8, which shows the relationship between the grindstone wear (the wear quantity when grinding 1000 pcs. of rollers each having a diameter of 7.5 mm is considered as the average wear quantity) and Young' modulus, in case where the Young's modulus of the grindstone is small, the grindstone wear tends to increase and, especially, in the case of 15 MPa or less, the grindstone wear increases. With the above conditions taken into consideration, preferably, the Young's modulus may be set in the range of 150 MPa to 15 MPa.

Rotation Evaluation Test 3

Figure 9:
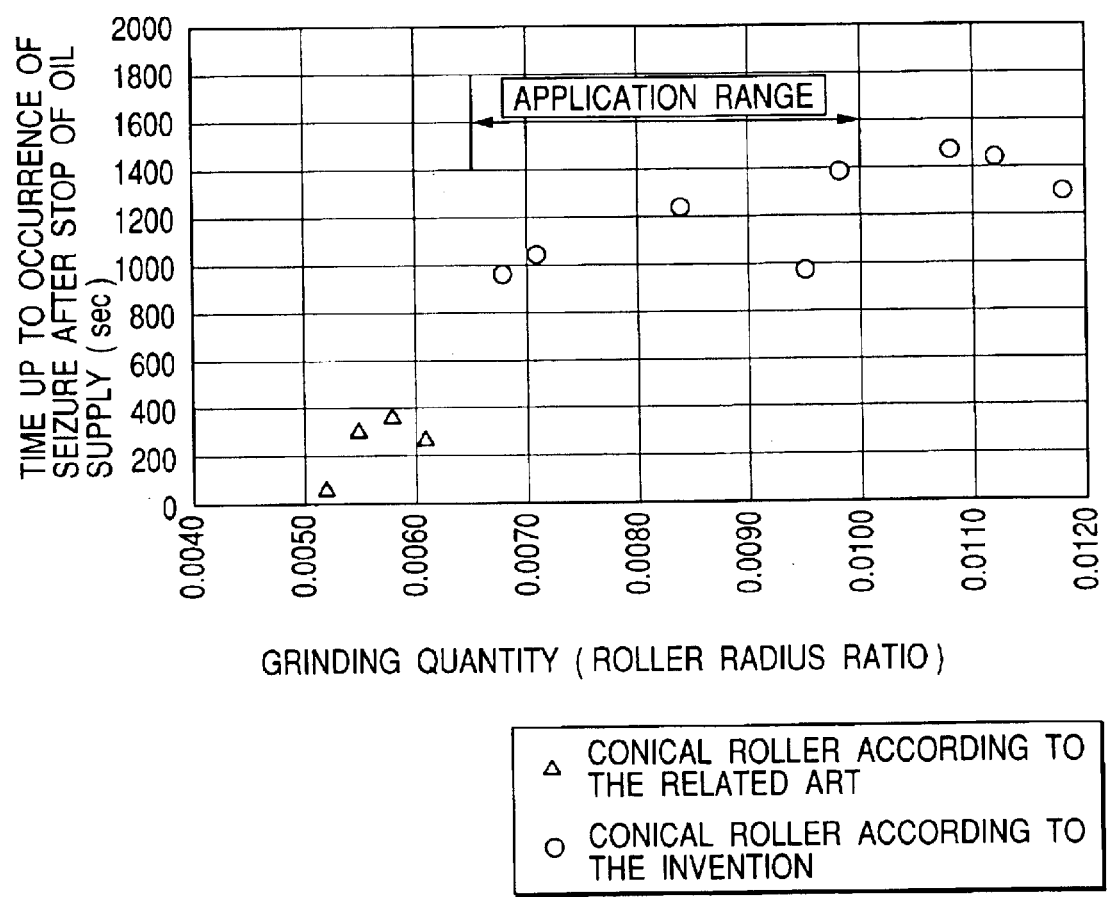
FIG. 9 is a graphical representation of the relationship between the drop quantity of the end face of a conical roller and the time necessary for occurrence of seizure.

The inventors conducted a third rotation evaluation test on the conical roller bearing under the following conditions, and checked the relationship between the drop quantity G of the conical roller end face and the time taken up to occurrence of seizure after stop of supply of lubricating oil. FIG. 9 shows the results of the check.

| TEST CONDITIONS | |
|---|---|
| Test bearing: | HR30306C |
| Maximum number of rotations: | 6000 min$^{-1}$ |
| Axial load: | 4000N |
| Lubricating oil: | Gear oil |
| Quantity of Oil supplied: | 480 cc/min. |

In FIG. 9, Δ designates a conventional conical roller bearing and ○ stands for a conical roller bearing according to the present invention.

As shown in FIG. 9, in case where a ratio G/R (which is hereinafter referred to as the roller end face drop quantity ratio) of the drop quantity G of the roller end face to the radius R of the conical roller 16 is 0.0065 (which exists between $P_B$ and $P_C$ in FIG. 4) or less, seizure occurs in a relatively early stage; but, in case where the roller end face drop quantity ratio G/R is equal to or larger than 0.0065 which is larger than $P_C$ in FIG. 4, seizure becomes hard to occur. Also, even in case where the roller end face drop quantity ratio G/R exceeds 0.01 which is larger than $P_D$ in FIG. 4, the effect thereof is not different so much from that of the roller end face drop quantity ratio G/R of 0.01, but only the grinding time increases. Therefore, preferably, the drop quantity ratio of the conical roller end face G/R may be set in the range of 0.0065 to 0.01.

As can be clearly understood from the test results shown in FIG. 9, since the contact portion of the end face of the conical roller 16, which is a portion to be slidingly contacted with the collar portion 15, is ground such that the outer contour line of the section thereof has a continuously curved line which passes through at least not only the first point $P_A$ but also between the third position $P_C$ and fourth position $P_D$, lubricating oil can be introduced easily into between the end face 16a of the conical roller 16 and collar portion 15. Thanks to this, the frictional heat occurring between the conical roller 16 and collar portion 15 can be reduced without enforcing special working on the end face of the conical roller 16 and the roller guide surface of the collar portion 15 or without changing the shape of the roller greatly.

As has been described heretofore, according to the present invention, there can be provided a roller bearing which can reduce the frictional heat generated between the roller and collar portion without enforcing special working on the end face of the roller and the roller guide surface of the collar portion or without changing the shape of the roller greatly.

What is claimed is:

1. A roller bearing including a collar portion formed in the end portion of a ring for guiding a plurality of cylindrical rollers in the circumferential direction of the ring, wherein a diameter of each of said cylindrical rollers is expressed as 2R,
   a position in which an end face of said cylindrical roller intersects with a center axial line of said cylindrical roller is expressed as an original point,
   a position distant from said original point by 0.65R in an outside diameter direction of said cylindrical roller is expressed as a first point,
   a position distant from said first point by 0.20R in the outside diameter direction of said cylindrical roller is expressed as a second point,
   a position distant from said second point by 0.0005R in the axial direction of said cylindrical roller is expressed as a third position,
   a position distant from said second point by 0.003R in the axial direction of said cylindrical roller is expressed as a fourth position, and
   the contact portion of the end face of said cylindrical roller to be slidingly contacted with said collar portion is ground so as to have a continuously curved shape in which the outer contour line of the section of said end face of said cylindrical roller passes through said first point and passes between said third and fourth positions.

2. The roller bearing as set forth in claim 1, wherein the longitudinal elastic coefficient of an elastic grindstone for finishing the end face of said roller is set in the range of 10 MPa to 500 MPa.

3. A roller bearing including a collar portion formed in the end portion of a ring for guiding a plurality of conical rollers in the circumferential direction of the ring, wherein a diameter of each of said conical rollers is expressed as 2R,
   a position in which an end face of said conical roller intersects with a center axial line of said conical roller is expressed as an original point,
   a position distant from said original point by 0.65R in an outside diameter of said conical roller is expressed as a first point,
   a position distant from said first point by 0.20R in the outside diameter direction of said conical roller is expressed as a second point,
   a position distant from said second point by 0.0065R in the axial direction of said conical roller is expressed as a third position,
   a position distant from said second point by 0.01R in the axial direction of said conical roller is expressed as a fourth position, and
   the contact portion of the end face of said conical roller to be slidingly contacted with said collar portion is ground so as to have a continuously curved shape in which the outer contour line of the section of the end face of said conical roller passes through said first point passes between said third and fourth positions.

4. The roller bearing as set forth in claim 3, wherein the longitudinal elastic coefficient of an elastic grindstone for finishing the end face of said roller is set in the range of 10 MPa to 500 MPa.

5. A roller bearing including a collar portion formed in an end portion of a ring for guiding a plurality of cylindrical rollers in the circumferential direction of the ring, wherein a contact portion of an end face of each of said cylindrical rollers to be slidingly contacted with said collar portion is ground so as to have a continuously curved shape in which the radius of the outer contour line of said end face contact portion decreases as the outer contour line goes outwardly in the radial direction of the roller.

* * * * *